(12) United States Patent
Zieger

(10) Patent No.: US 11,960,307 B2
(45) Date of Patent: Apr. 16, 2024

(54) PRESSURE REGULATING VALVE AND PRESSURE REGULATOR

(71) Applicant: Andreas Zieger, Hofstätten an der Raab (AT)

(72) Inventor: Andreas Zieger, Hofstätten an der Raab (AT)

(*) Notice: Subject to any disclaimer, the term of this patent is extended or adjusted under 35 U.S.C. 154(b) by 0 days.

(21) Appl. No.: 17/637,732

(22) PCT Filed: Aug. 20, 2020

(86) PCT No.: PCT/AT2020/060313
§ 371 (c)(1),
(2) Date: Feb. 23, 2022

(87) PCT Pub. No.: WO2021/042145
PCT Pub. Date: Mar. 11, 2021

(65) Prior Publication Data
US 2022/0283598 A1 Sep. 8, 2022

(30) Foreign Application Priority Data
Sep. 3, 2019 (AT) .............................. GM 95/2019

(51) Int. Cl.
*G05D 16/10* (2006.01)
(52) U.S. Cl.
CPC ......... *G05D 16/107* (2019.01); *G05D 16/103* (2013.01); *Y10T 137/7826* (2015.04)
(58) Field of Classification Search
CPC ......... Y10T 137/7823; Y10T 137/7826; Y10T 137/7795
See application file for complete search history.

(56) References Cited

U.S. PATENT DOCUMENTS 2,331,084 A * 10/1943 Sorensen ............. G05D 16/107
137/454.5
2,949,128 A * 8/1960 Carter ..................... F25B 41/20
137/630.14
(Continued)

FOREIGN PATENT DOCUMENTS

DE          10325846 A1   1/2004
DE        102007039925 A1 4/2008

OTHER PUBLICATIONS

International Search Report, dated Oct. 5, 2020, for PCT/AT2020/060313 filed Aug. 20, 2020.

*Primary Examiner* — Robert K Arundale
(74) *Attorney, Agent, or Firm* — Workman Nydegger

(57) ABSTRACT

A pressure control valve for gases and/or liquids comprising a first sealing body and a second sealing body for opening and closing a first flow path and a second flow path, respectively. The first and the second sealing bodies can be installed in an inflow for gases and/or liquids in order to define the first and the second flow paths therein. The first sealing body is guided in an axially movable fashion. The second sealing body is guided in an axially movable fashion within the first sealing body. The first sealing body is movable by a force in the effective direction from an outflow to an inflow from a closing position into an opening position in which the first flow path is opened. The second sealing body is movable by a force in the effective direction from the outflow to the inflow from a closing position into an opening position in which the second flow path is opened.

10 Claims, 3 Drawing Sheets

(56) References Cited

U.S. PATENT DOCUMENTS

| | | | |
|---|---|---|---|
| 4,699,351 A | 10/1987 | Wells | |
| 4,802,504 A * | 2/1989 | Politi | F17C 13/123 |
| | | | 137/454.5 |
| 5,048,790 A | 9/1991 | Wells | |
| 5,735,582 A | 4/1998 | Eith et al. | |
| 6,523,656 B2 | 2/2003 | McVey | |
| 2002/0029812 A1 | 3/2002 | Hotta et al. | |
| 2006/0260692 A1* | 11/2006 | Pechtold | H01M 8/0438 |
| | | | 137/505.42 |
| 2008/0047619 A1* | 2/2008 | Pechtold | G05D 16/107 |
| | | | 137/505.41 |
| 2013/0277587 A1 | 10/2013 | Zieger | |

* cited by examiner

PRESSURE REGULATING VALVE AND PRESSURE REGULATOR

The invention relates to a universally usable pressure control valve for gases and/or liquids according to the preamble of claim 1. Furthermore, the invention relates to a pressure regulator comprising a pressure control valve.

Fuel storage systems for storing gaseous fuels such as, e.g., natural gas or hydrogen with nominal pressures of up to 700 bar are designed with a pressure regulator, among other things, during which perfusion a pressure reduction from the storage pressure of the compressed gas container to the working pressure of the consumer takes place.

A pressure regulator is generally composed of at least one flow path between an inlet-side inflow on the high-pressure side (storage) and an outlet-side outflow on the low-pressure side (consumer), with a valve in the flow path as an opening element for changing the flow cross-section of this flow path and an actuating device for influencing the position of the valve, the pressure control valve being arranged on the high-pressure side or on the low-pressure side, depending on the design of the pressure regulator, and the actuating device being arranged on the high-pressure side or on the low-pressure side, depending on the design of the pressure regulator.

Such pressure regulators for large inlet pressure fluctuations and outlet pressure fluctuations as small as possible with a high flow rate are known, inter alia, from U.S. Pat. No. 6,523,656, DE 10325846 or DE 102007039925. U.S. Pat. No. 6,523,656 discloses a two-stage pressure regulator with the appropriate structural complexity for two separate pressure regulators. DE 10325846 discloses a single-stage pressure-compensated pressure regulator with the drawback of a pressure-loaded dynamic high-pressure seal made of an elastomer. DE 102007039925 discloses a single-stage pressure regulator with flow cross-sections arranged in parallel and two closures, but unsteady control behaviour since only the first closure responds to pressure fluctuations on the outlet side.

It is an object of the invention to create a universally usable pressure control valve for mechanical, electrical, electromagnetic, pneumatic, hydraulic, hybrid or dome pressure regulators with high control quality and steady control behaviour across the entire inlet pressure and flow range in a simple design and on a small installation space. A further object of the invention is to provide a pressure regulator comprising a pressure control valve having the above-described properties.

The object is achieved by providing a pressure control valve having the features of claim 1 as well as by providing a pressure regulator comprising a pressure control valve according to the invention. Advantageous designs of the invention are outlined in the dependent claims and in the specification. The pressure control valve comprises an arrangement of two coaxially arranged flow paths with different nominal widths and two coaxially arranged sealing bodies for closing the two flow paths on the high-pressure side, with both sealing bodies without exception being opened and closed by an actuating device arranged on the low-pressure side.

The pressure control valve according to the invention for gases and/or liquids comprises a first sealing body for opening and closing a first flow path between an inflow and an outflow for gases and/or liquids and a second sealing body between the inflow and the outflow for opening and closing a second flow path, the first and the second flow paths being arranged concentrically with different nominal widths. The first and the second sealing bodies are designed so as to be installed in the inflow for gases and/or liquids and to define the first and the second flow paths therein, the first and the second sealing bodies being arranged concentrically to one another and concentrically to the two flow paths. The first sealing body is guided in an axially movable fashion, and the second sealing body is guided in an axially movable fashion within the first sealing body. The first sealing body is designed so as to be moved by a force of the actuating device with an effective direction from the outflow to the inflow from a closing position into an opening position in which the first flow path is opened, and the second sealing body is designed so as to be moved by a force of the actuating device with an effective direction from the outflow to the inflow from a closing position into an opening position in which the second flow path is opened.

In a preferred embodiment of the pressure control valve according to the invention, the second sealing body is designed so as to be charged directly with a compressive force as the force of the actuating device with an effective direction from the outflow to the inflow for moving from the closing position into the opening position, and the first sealing body is designed so as to be charged indirectly with a compressive force as the force of the actuating device with an effective direction from the outflow to the inflow for moving from the closing position into the opening position, as a result of the two sealing bodies being coupled to one another by a driver formed on at least one of the two sealing bodies, the driver being designed for transmitting the compressive force exerted on the second sealing body as the force of the actuating device onto the first sealing body. In a further development of this embodiment of the pressure control valve, the driver has a bearing surface on the first sealing body and a bearing surface on the second sealing body for moving the first sealing body, and the first sealing body is movable by a compressive force as the force of the actuating device onto the second sealing body as soon as the bearing surface of the second sealing body rests against the bearing surface of the first sealing body.

The pressure regulator according to the invention comprises a housing with an inflow for gases and/or liquids on the high-pressure side and an outflow on the low-pressure side. A pressure control valve according to the invention is incorporated in the inflow. On the low-pressure side of the pressure regulator, an actuating device is provided which is coupled to the pressure control valve and is designed for applying a force with an effective direction from the outflow to the inflow, in particular a compressive force, onto the first and the second sealing bodies of the pressure control valve, depending on a desired pressure in the outflow.

The characteristics of the invention become apparent from the following description of possible embodiments and on the basis of the drawings.

Figure 1:
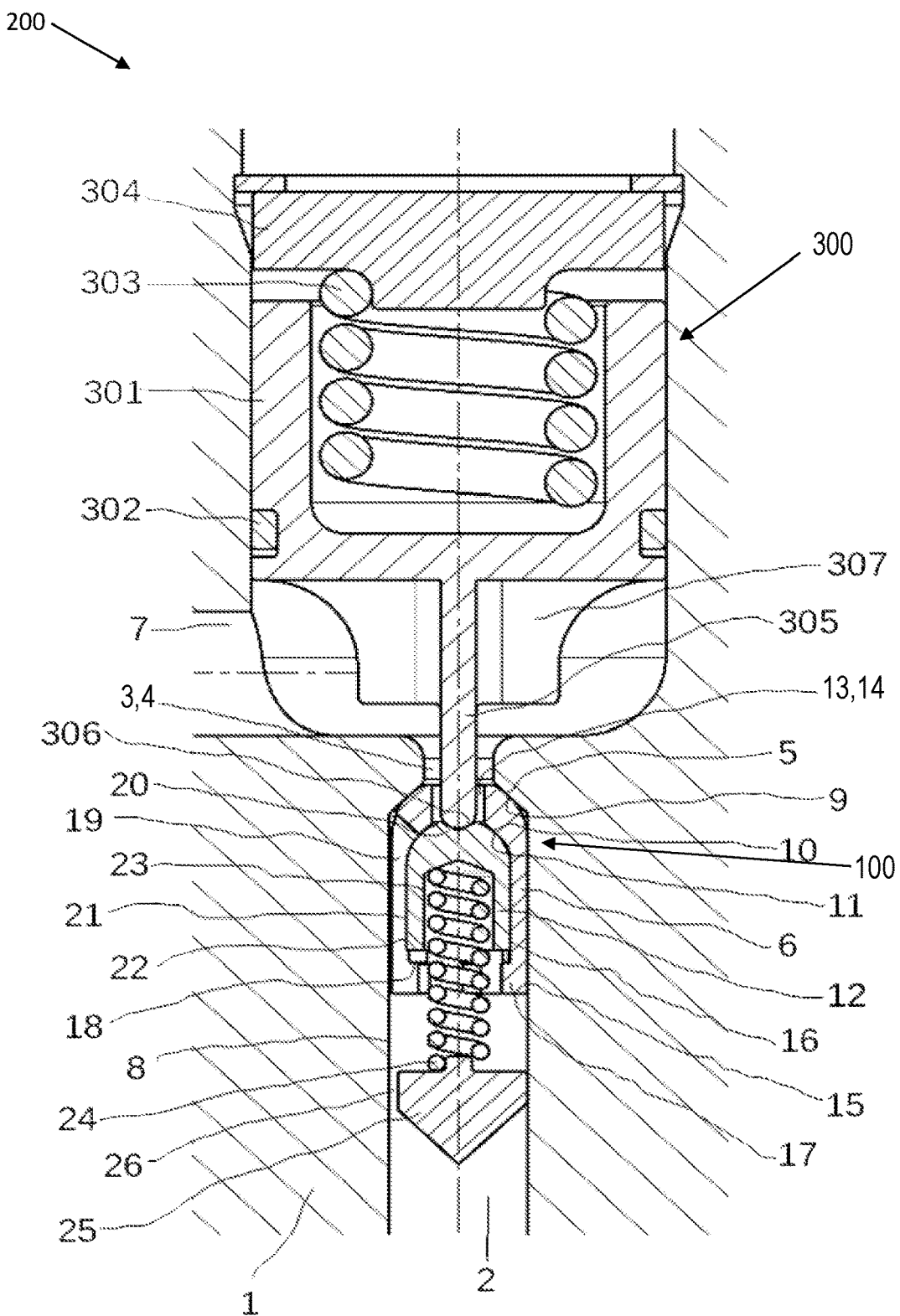
FIG. 1 shows a possible embodiment of the pressure control valve according to the invention in the closed state.

FIG. 1 shows an embodiment of the universally usable pressure control valve 100 according to the invention in the closed state, installed in a mechanical pressure regulator 200, the pressure control valve 100 being used for reducing the pressure on the high-pressure side of the pressure regulator 200. Furthermore, a mechanical actuating device 300 for actuating the pressure control valve 100 is provided on the low-pressure side of the pressure regulator 200. The actuating device 300 comprises a one- or multi-part pressurized piston 301 including a suitable seal 302, a compression spring 303 for applying the setting and control force, a spring support 304 for supporting the compression spring 303, a one- or multi-part pusher 305 with a contact surface 306 to the pressure control valve 100 and one or more recesses 307 for gas flow control in a section of a pressure regulator housing 1. The gas flow control within the housing 1 comprises an inflow 2 on the high-pressure side for supplying the gas from a storage container, a passage 3 as the first flow path 4 with a sealing seat 5 for sealing against a first sealing body 6 of the pressure control valve 100, an outflow 7 on the low-pressure side for discharging the gas from the pressure regulator 200, and a component guide 8 for guiding the first sealing body 6 radially within the housing 1. The pressure control valve 100 comprises the axially movable one-part first sealing body 6 which has a sealing seat 9 for sealing against a sealing seat 5 of the housing 1 and a sealing seat 10 for sealing against a sealing seat 11 on a second sealing body 12 of the pressure control valve 100. A connecting bore 13 serves as a second flow path 14 between the sealing seat 9 and the sealing seat 10 of the first sealing body 6. A first external guide surface 15 is designed for radially guiding the first sealing body 6 on the component guide 8 of the housing 1. A second internal guide surface 16 of the first sealing body 6 is provided for axially guiding the second sealing body 12 in the first sealing body 6. A driver 17 serves as a component coupling between the first sealing body 6 and the second sealing body 12. The driver 17 comprises a bearing surface 18 for moving the second sealing body 12. The first sealing body 6 has one or several cutouts 19 for supplying the high-pressure gas to the two sealing seats 9, 10 and for the assembly of the second sealing body 12. The axially movable one-part second sealing body 12 is provided within the first sealing body 6 with a sealing seat 11 for sealing against the sealing seat 10 of the first sealing body 6, a receptacle 20 for positioning the contact surface 306 of the needle-shaped pusher 305 of the actuating device 300, a guide surface 21 for guiding the second sealing body 12 on the guide surface 16 of the first sealing body 6, a bearing surface 22 for support on the bearing surface 18 of the first sealing body 6 and an internal bore 23 for receiving a closing spring 24. The closing spring 24 serves for closing the pressure control valve 100 when the actuating device 300 is missing or defective and for improving the sealing of the pressure control valve 100 when storage pressures are low. A spring support 25 serves for supporting the closing spring 24 against the housing 1 with one or several cutouts 26 for supplying the high-pressure gas to the two sealing bodies 6, 12.

The needle-shaped pusher 305 of the actuating device 300 on the low-pressure side is arranged within the passage 3 and the connecting bore 13 and rests against the receptacle 20 of the second sealing body 12 during a pressure control operation.

The passage 3 constitutes the first flow path 4 between the inflow 2 and the outflow 7 and is closed and opened, respectively, by the first sealing body 6. The connecting bore 13 in the first sealing body 6 constitutes the second flow path 14 between the inflow 2 and the outflow 7 and is closed and opened, respectively, by the second sealing body 12.

The two sealing bodies 6, 12 of the pressure control valve 100 are designed so as to be axially movable and are moved into their opening position exclusively by the actuating device 300. In a pressure control operation, the pusher 305 of the actuating device 300 on the low-pressure side comprising a contact surface 306 is in direct contact with the second sealing body 12 via the receptacle 20 and thus moves the second sealing body 12 synchronously with the actuating device 300. The actuating device 300 on the low-pressure side has no direct connection to the first sealing body 6. If the maximum stroke of the second sealing body 12 has been achieved and the bearing surface 22 of the second sealing body 12 thus rests against the bearing surface 18 of the first sealing body 6, the first sealing body 6 is indirectly mechanically connected to the actuating device 300 via the second sealing body 12, and the pusher 305 of the actuating device 300 on the low-pressure side thus moves the first sealing body 6 and the second sealing body 12 synchronously with the actuating device 300.

The second sealing body 12 can assume a first end position in the closed state with its sealing seat 11 resting against the sealing seat 10 of the first sealing body 6 at a first flow rate, a second end position in the completely opened state at a maximum stroke of the second sealing body 12 with its bearing surface 22 resting against the bearing surface 18 of the first sealing body 6 at a second flow rate, as well as any positions with an associated flow rate between the first and the second end position, depending on the position of the actuating device 300. The first flow rate when the second sealing body 12 is closed is zero. The second flow rate corresponds to the nominal flow rate of the opened second sealing body 12. The first sealing body 6 can assume a first end position in the closed state with its sealing seat 9 resting against the sealing seat 5 in the housing 1 at a first flow rate, a second end position in the completely opened state at a maximum stroke of the actuating device 300 at a second flow rate and any positions with an associated flow rate between the first and the second end position, depending on the position of the actuating device 300. The first flow rate corresponds to the nominal flow rate of the opened second sealing body 12. The second flow rate corresponds to the nominal flow rate of the opened first sealing body 6.

According to FIG. 1, in the closed state, the closing spring 24 and the active compressive forces press the second sealing body 12 with its sealing seat 11 against the sealing seat 10 on the first sealing body 6, thus pressing the first sealing body 6 with a first sealing seat 9 against the sealing seat 5 in the housing 1. The first flow path 4 and the second flow path 14 are closed.

Figure 2:
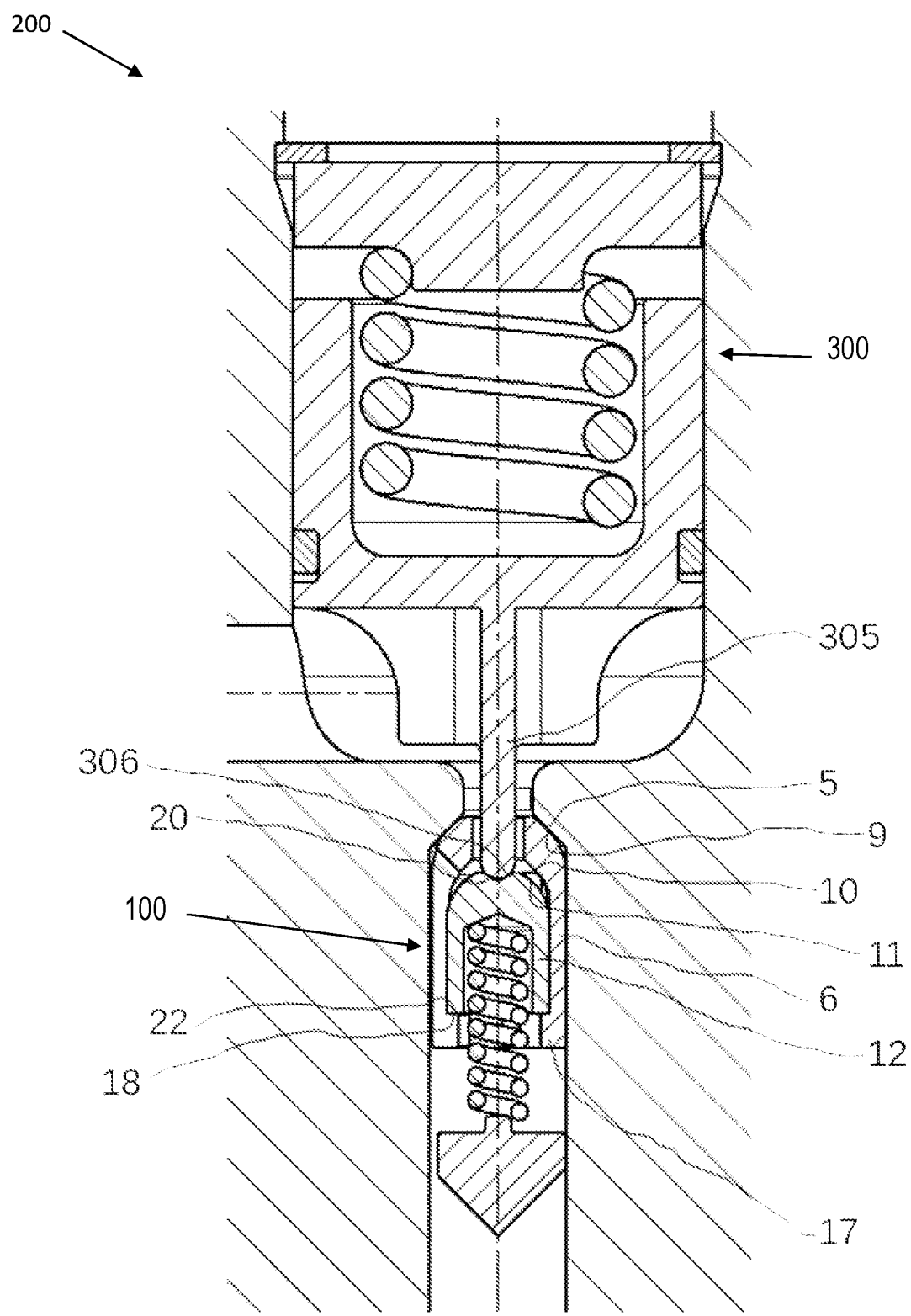
FIG. 2 shows the pressure control valve of FIG. 1 in the opened state with low flow rates or high inlet pressures.

According to FIG. 2, when the outlet pressure falls, the actuating device 300 with its pusher 305 presses the second sealing body 12 with its sealing seat 11 against the active compressive forces and the force of the closing spring 24 from the second sealing seat 10 of the first sealing body 6, thus opening the second flow path 14 until the bearing surface 22 of the second sealing body 12 rests against the bearing surface 18 of the first sealing body 6.

Figure 3:
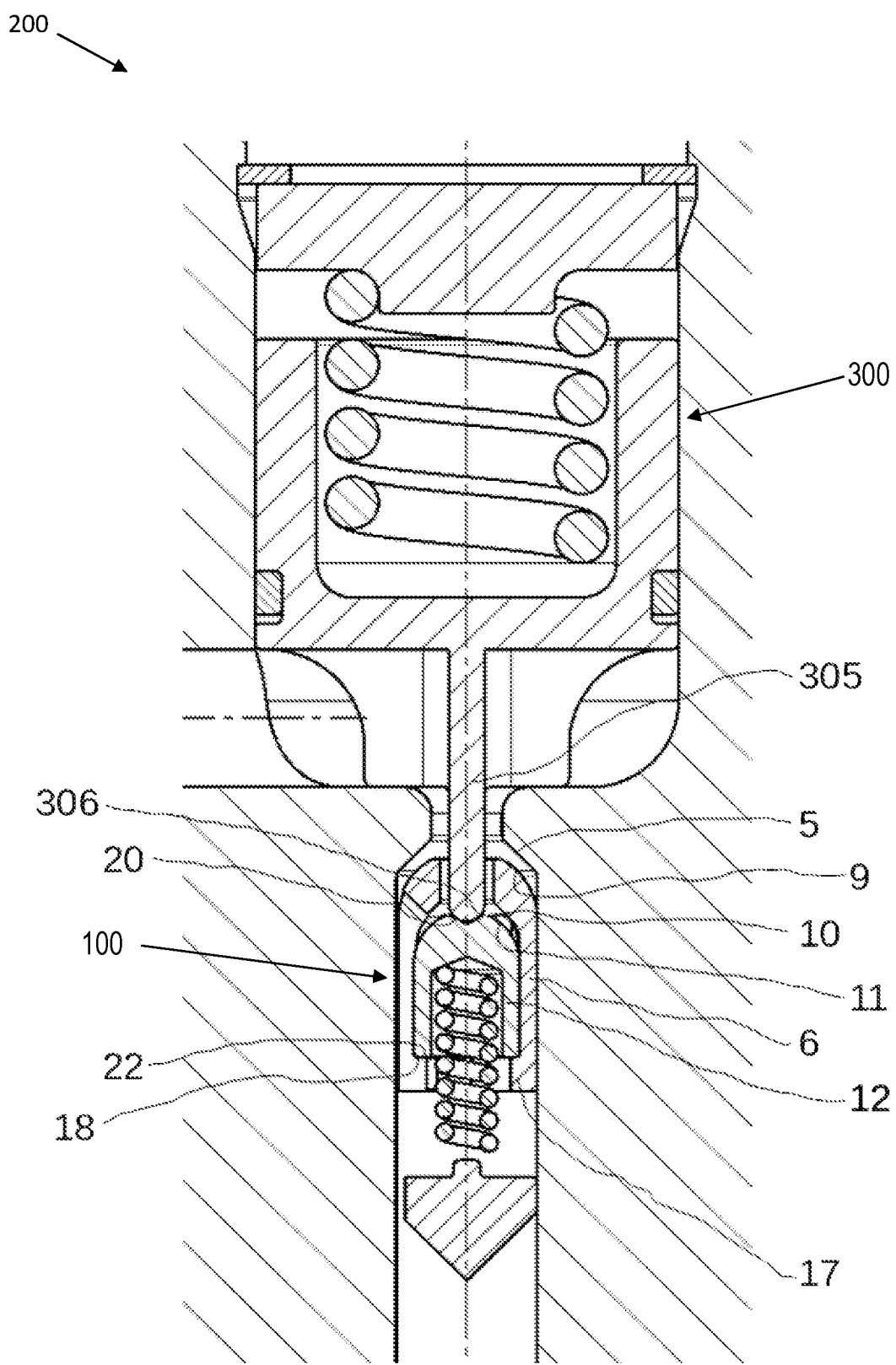
FIG. 3 shows the pressure control valve in the opened state with high flow rates or low inlet pressures.

According to FIG. 3, as the outlet pressure continues to fall due to the component coupling via the driver 17, the actuating device 300 with its pusher 305 presses the first sealing body 6 with its sealing seat 9 against the active compressive forces and the force of the closing spring 24 from the sealing seat 5 in the housing 1 when the bearing surface 22 of the second sealing body 12 rests against the bearing surface 18 of the first sealing body 6, thus opening the second flow path 14 up to the maximum stroke of the actuating device 300 as an abutment of the actuating device 300 in the housing 1.

The two sealing bodies 6, 12 or, respectively, the associated sealing seats 5, 9, 10, 11 are preferably dimensioned in such a way that the actuating device force to be applied increases steadily and without a sudden increase as the stroke of the actuating device 300 increases in order to enable a simple control or regulation of the outlet pressure. The flow diameter of the second flow path 14 is preferably approx. 25% of the first flow path 4.

The sealing seat 5 is preferably implemented directly in the housing 1, the pressure control valve 100 is particularly preferably arranged so as to reduce the pressure-loaded surfaces within the high-pressure connection. Optionally, a screw-in or slide-in cartridge (cartridge design) is also possible so that the pressure control valve 100 is designed with its own housing and is connected to the housing 1 of the pressure regulator 200.

The sealing seat 5 is preferably designed as a conical transition from the component guide 8 to the passage. Optionally, a flat surface arranged perpendicularly to the component guide 8 or the transition radius to the passage 3 may also be used as the sealing seat 5.

The sealing seat 10 is preferably designed as a conical transition from the guide surface 16 to the connecting bore 13. Optionally, a flat surface arranged perpendicularly to the guide surface 16 or the transition radius to the connecting bore 13 may also be used as the sealing seat 10.

The sealing seat 9 is preferably designed as a spherical surface. Optionally, a flat surface arranged perpendicularly to the guide surface 15, the transition radius to the connecting bore 13 or a conical surface may also be used as the sealing seat 9.

The sealing seat 11 is preferably designed as a spherical surface. Optionally, a flat surface arranged perpendicularly to the guide surface 16, the transition radius to the receptacle 20 or a conical surface may also be used as the sealing seat 11.

The needle-shaped pusher 305 is preferably configured on the actuating device 300 on the low-pressure side. Optionally, the needle-shaped pusher 305 is implemented on the second sealing body 12 or, in each case, on the actuating device 300 on the low-pressure side and on the second sealing body 12.

Optionally, the needle-shaped pusher 305 is designed as an independent component.

The driver 17 is preferably designed in one piece with the first sealing body 6. Optionally, the driver 17 is designed as a separate component and is mechanically connected to the first sealing body 6.

Preferably, the first sealing body 6 and the second sealing body 12 are each designed in one piece. Optionally, the first sealing body 6 and/or the second sealing body 12 are designed in multiple parts.

Optionally, the closing spring 24 is not guided in an internal bore 23 of the second sealing body 12, but is accommodated on an external pin on the second sealing body 12. Optionally, a second closing spring is used for the first sealing body 6. Optionally, the closing spring is supported against the first sealing body 6.

Optionally, the groove for accommodating the seal 302 is designed in the housing 1.

The spring support is screwed, glued, pressed into the housing or held in position by an additional component. Optionally, a filter is used as the spring support.

The limitation of the stroke of the actuating device 300 is effected by the housing 1 in that the piston 301 or a component connected to the piston 301 rests against the housing 1. Optionally, an additional component (e.g., a retaining ring) is used for limiting the stroke.

Any resilient element or a combination of any resilient elements is used as the compression spring 303 and/or as the closing spring 24, which opposes its/their deformation with a force acting against the direction of deformation.

Preferably, the first sealing body 6 is manufactured from a polymer and the second sealing body 12 is manufactured from a metallic material. Optionally, both sealing bodies 6, 12 are manufactured from a polymer or a metallic material.

Optionally, n (arbitrary number) concentrically arranged flow paths can be closed and opened by n (arbitrary number) concentrically arranged one-part sealing bodies with an actuating device 300.

Optionally, the actuating device 300 can be designed as an inline variant.

The present invention of a universally usable pressure control valve 100 can be used for mechanical, electrical, electromechanical, pneumatic, hydraulic, hybrid or dome pressure regulators due to the location of the actuating device 300 on the low-pressure side and the location of the pressure control valve 100 on the high-pressure side. The embodiment with two concentrically arranged flow paths 4, 14, which are closed and opened by two concentrically arranged one-part sealing bodies 6, 12 with an actuating device 300, reduces the structural complexity and the installation space. The steady opening process from the closed state up to the maximum opening stroke of the actuating device 300 by the driver 17 as a component coupling brings about high control quality and a steady control behaviour across the entire inlet pressure and flow range. By guiding the first sealing body 6 in the housing 1 and guiding the second sealing body 12 in the first sealing body 6, a stable pressure control valve 100 is obtained with flow forces having little impact on the control behaviour.

The invention claimed is:

1. A pressure control valve for gases and/or liquids comprising:
   a first sealing body for opening and closing a first flow path between an inflow and an outflow for gases and/or liquids and
   a second sealing body between the inflow and the outflow for opening and closing a second flow path, the first and the second flow paths being arranged concentrically with different nominal widths,
   wherein the first and the second sealing bodies are designed so as to be installed in the inflow for gases and/or liquids and to define the first and the second flow paths therein, the first and the second sealing bodies being arranged concentrically to one another and concentrically to the two flow paths,
   wherein the first sealing body is designed so as to be moved by a force of an actuating device with an effective direction from the outflow to the inflow from a closing position into an opening position in which the first flow path is opened, and the second sealing body is designed so as to be moved by a force of the actuating device with an effective direction from the outflow to the inflow from a closing position into an opening position in which the second flow path is opened,
   wherein the first sealing body is constructed in one piece, wherein the second sealing body is constructed in one piece,
   wherein the first sealing body being guided in an axially movable fashion within a housing and the second sealing body being guided in an axially movable fashion within the first sealing body, wherein the two sealing bodies are coupled to one another by a driver formed on at least one of the two sealing bodies, the first sealing body comprising a first sealing seat and the second sealing body comprising a second sealing seat,
   wherein the second sealing body is designed so as to be charged directly with a compressive force with an effective direction from the outflow to the inflow for moving from the closing position into the opening position, and the first sealing body is designed so as to be charged indirectly with a compressive force with an effective direction from the outflow to the inflow for moving from the closing position into the opening position, wherein the driver being designed for transmitting the compressive force exerted on the second sealing body onto the first sealing body, wherein the first sealing body comprises one or several cutouts for supplying the high-pressure gas to the first sealing seat and the second sealing seat and for the assembly of the second sealing body within the first sealing body.

2. A pressure control valve according to claim 1, wherein the driver has a bearing surface on the first sealing body and a bearing surface on the second sealing body for moving the first sealing body, and the first sealing body is movable by a compressive force onto the second sealing body as soon as the bearing surface of the second sealing body rests against the bearing surface of the first sealing body.

3. A pressure control valve according to claim 1, wherein at least one closing spring is provided for closing the first and the second sealing bodies, with the closing spring being supported on a spring support.

4. A pressure control valve according to claim 3, wherein the spring support is a filter.

5. A pressure control valve according to claim 1, wherein the flow diameter of the second flow path is 20-40% of the flow diameter of the first flow path.

6. A pressure regulator comprising a housing with an inflow for gases and/or liquids on the high-pressure side and an outflow on the low-pressure side, wherein the pressure regulator comprises a pressure control valve according to claim 1 and the inflow of the pressure regulator is the inflow of the pressure control valve and, on the low-pressure side of the pressure regulator, the actuating device of the pressure control valve is provided and is designed for applying a force with an effective direction from the outflow to the inflow, onto the first and the second sealing bodies of the pressure control valve, depending on a desired pressure in the outflow, wherein a component guide for radially guiding the first sealing body is provided in the inflow.

7. A pressure regulator according to claim 6, wherein the actuating device is a mechanical actuating device and a limitation of the stroke of the mechanical actuating device is constituted by the housing or by a component connected to the housing.

8. A pressure regulator according to claim 6, wherein a spring support is arranged in the inflow and is provided with cutouts for supplying the gas or the liquid to the two sealing bodies.

9. A pressure regulator according to claim 6, wherein the actuating device has a pusher for exerting the compressive force onto the first and the second sealing bodies, the pusher being arranged in the second flow path and in the first flow path.

10. A pressure regulator according to claim 9, wherein the two sealing bodies are coupled to one another by a driver formed on at least one of the two sealing bodies, the driver being designed for moving the second sealing body and the first sealing body synchronously with the pusher.

* * * * *